US008851395B2

(12) United States Patent
Woolley et al.

(10) Patent No.: US 8,851,395 B2
(45) Date of Patent: Oct. 7, 2014

(54) METHOD FOR THE APPLICATION OF A PERMANENT ELECTRICAL CONTACT TO THE WEB OF RAILS

(75) Inventors: Kevin Ernest Woolley, Dordon Tamworth (GB); Benjamin Ryan Mullaley, Green Lane Coventry (GB)

(73) Assignee: Cembre Ltd., Sutton Coldfield (GB)

( * ) Notice: Subject to any disclaimer, the term of this patent is extended or adjusted under 35 U.S.C. 154(b) by 49 days.

(21) Appl. No.: 13/514,317

(22) PCT Filed: Dec. 18, 2009

(86) PCT No.: PCT/EP2009/067555

§ 371 (c)(1), (2), (4) Date: Jun. 7, 2012

(87) PCT Pub. No.: WO2011/072752

PCT Pub. Date: Jun. 23, 2011

(65) Prior Publication Data

US 2012/0246930 A1 Oct. 4, 2012

(51) Int. Cl.

| | |
|---|---|
| ***F16B 13/00*** | (2006.01) |
| ***H01R 4/64*** | (2006.01) |
| ***H01R 43/00*** | (2006.01) |

(52) U.S. Cl.

CPC . *H01R 4/64* (2013.01); *H01R 43/00* (2013.01)
USPC .................... 238/14.05; 238/14.14; 238/14.2; 29/729

(58) Field of Classification Search

CPC .......... H01R 43/00; H01R 4/64; B21D 37/20; B21K 5/20; B21J 5/12
USPC ........ 29/874, 884, 729, 739; 238/14.2, 14.14, 238/14.05; 72/355.4, 359, 370.06, 370.03, 72/252
See application file for complete search history.

(56) References Cited

U.S. PATENT DOCUMENTS

| | | | | |
|---|---|---|---|---|
| 3,891,296 | A * | 6/1975 | Gutshall | 439/782 |
| 4,174,148 | A * | 11/1979 | Obuch et al. | 439/782 |
| 4,250,731 | A * | 2/1981 | Cremer | 72/355.4 |
| 4,796,457 | A * | 1/1989 | Iijima | 72/370.03 |
| 5,277,049 | A * | 1/1994 | Endo | 72/391.4 |
| 5,707,190 | A * | 1/1998 | Hiraguri et al. | 411/56 |
| 6,244,517 | B1 * | 6/2001 | Courtois et al. | 238/14.05 |
| 2012/0246930 | A1 * | 10/2012 | Woolley et al. | 29/874 |

FOREIGN PATENT DOCUMENTS

| | | |
|---|---|---|
| EP | 0 575 259 A1 | 12/1993 |
| EP | 0 945 919 A1 | 9/1999 |
| FR | 2 753 752 A1 | 3/1998 |

* cited by examiner

*Primary Examiner* — Minh Trinh
(74) *Attorney, Agent, or Firm* — Dickstein Shapiro LLP

(57) ABSTRACT

Method for applying an electrical contact to a hole (2) of a metal wall portion (1), comprising the steps of providing a bush (12), a punch (11) with a shaft (16), an expansion portion (19) and a connecting portion (20) thereof, a pulling device (21) with an abutment portion (22) and a pulling mechanism (23) for engaging the punch (11) and to pulling it proximally with respect to the abutment portion (22), inserting the punch (11) in a passage hole (25) of the bush (12) so that the connecting portion (20) protrudes proximally from the bush and the expansion portion (19) is located on end (14), bush connecting the punch (11) to the pulling device (21), inserting the preassembled bush (12)-punch (11)-unit from a proximal side of the wall portion (1) distally in the hole (2) and activating the pulling device (21) to pull the punch (11) proximally through the bush, thereby radially expanding bush and permanently anchoring it in the hole (2).

9 Claims, 2 Drawing Sheets

METHOD FOR THE APPLICATION OF A PERMANENT ELECTRICAL CONTACT TO THE WEB OF RAILS

The present invention relates in general to methods and devices for the application of a permanent electrical contact to the web of rails and the like and particularly to a method and kit for the application of such a permanent electrical contact from one side only, especially in cases in which e.g. the rail web or a tubular column can be accessed from one side only.

EP 0 328 946 discloses a permanent electrical contact for the web of rails and the like, comprising a bush of electrically conducting material having a cylindrical stem insertable from a first side in a hole previously provided in a web of a railway rail and a flanged head engageable in abutment on that first side with the portion of the rail web surrounding the hole. The bush has an axial through hole in which a punch is inserted from that first side (side of the flanged head) and connected to a hydraulic jack arranged on a second side of the rail web opposite that first side and pulled from said first side to said second side through the bush thereby causing a radial expansion of the cylindrical stem and a stable anchoring thereof in the hole of the rail web.

The method and device known from EP 0 328 946 tightly and stably couples the electrical contact, i.e. the bush, in the hole of the rail web, thereby reducing contact resistances and mechanical stresses on the contact itself.

Notwithstanding the excellent contact properties of this known solution, it requires free access to both sides of the web (or more generally: to both sides of the wall) to which the electrical contact is intended to be applied, since the bush and the punch are inserted from a first side and the hydraulic jack is positioned on the opposite side thereof.

Accordingly, the known solution cannot be used in cases in which the wall, e.g. a rail web or a tubular column, can only be accessed from one side.

The object of the present invention is therefore to provide a method and kit of devices for applying a permanent electrical contact to a metal wall portion, particularly of a rail web or tubular profile, having features such that the wall portion need to be accessed from one side only.

Those and other objects are achieved by a method for applying a permanent electrical contact to a metal wall portion according to claim 1 and by a kit of devices for applying a permanent electrical contact to a metal wall portion according to claim 10.

In accordance with an aspect of the invention, a method for applying a permanent electrical contact to a metal wall portion comprises the steps of:

providing a bush with a tubular stem having a distal end and a proximal end, providing a punch having an elongate shaft with a distal end and a proximal end, an enlarged expansion portion arranged near the distal end of the shaft and a connecting portion arranged near the proximal end of the shaft, providing a pulling device having a distal abutment portion and a pulling mechanism with a pull connector adapted to connect the connecting portion of the punch and to pull it proximally with respect to the abutment portion, inserting the punch in the bush so that the connecting portion protrudes proximally from the proximal end of the tubular stem and the expansion portion is arranged at the distal end of the tubular stem, connecting the connecting portion of the punch with the pull connector of the pulling device to connect the pre-assembled bush-punch-unit with the pulling device, inserting the bush-punch-unit from a proximal side of the wall portion distally in a hole of the wall portion, activating the pulling device to pull the punch with its expansion portion proximally through the tubular stem of the bush, while the abutment portion pushes distally against the proximal end of the tubular stem, thereby radially expanding the tubular stem and permanently anchoring it in the hole.

This enables the fitter to install a permanent electrical contact in a wall portion, e.g. of a rail web or tubular profile, accessing it from one side only.

In accordance with a further aspect of the invention, the bush comprises a flanged head formed on a proximal end of the tubular stem and, during insertion of the bush-punch-unit in the hole, the bush is pushed distally until the flanged head abuts against a proximal wall surface surrounding the hole.

This enables the fitter to precisely position the bush in the hole before activating the pulling device.

In accordance with a yet further aspect of the present invention, the bush comprises a funnel shaped, preferably substantially truncated cone shaped expander seat formed at the distal end of the tubular stem and adapted to receive at least a part of the expansion portion of the punch.

This promotes a radial expansion of the distal end of the stem, rather than an axial compression thereof.

Moreover, near the proximal end of the tubular stem of the bush, a ring space is formed which is larger than the passage hole of the stem and adapted to receive excess material which is dragged by the punch proximally, thereby preventing undesired excessive deformation of the flanged head or, more generally spoken, of the proximal end of the stem.

These and other objects and advantages of the present invention shall be made apparent from the accompanying drawings and the description thereof, which illustrate embodiments of the invention and, together with the general description of the invention given above, and the detailed description of the embodiments given below, serve to explain the principles of the present invention.

Figure 1:
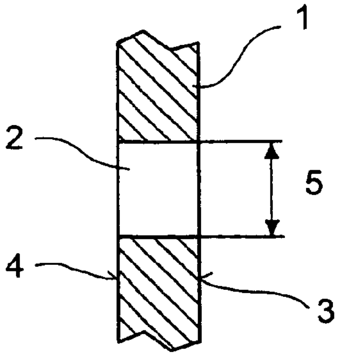
FIG. 1 is a schematic cross-sectional view of a metal wall portion, e.g. of a railway rail web or of a tubular profile, having a hole to which a permanent electrical contact shall be applied.

Referring to the drawings where like numerals denote like components throughout the several views, FIG. 1 depicts a metal wall portion 1, e.g. of a railway rail web or of a tubular profile, in which a hole 2 has been drilled for the application of a permanent electrical contact. The wall portion 1 has a proximal surface 3, which is considered to be freely accessible, and an opposite distal surface 4, which thanks to the present invention need not be accessed during the application of the electrical contact. Throughout the following description the expression "proximal" denotes a side or direction facing towards the fitter and the expression "distal" denotes a side or direction facing away from the fitter.

Figure 2:
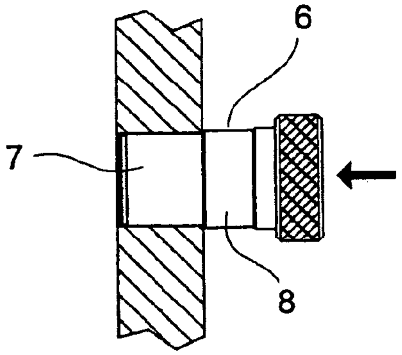
FIG. 2 shows a step of verifying the correct hole diameter with a caliber device.
Figure 3:
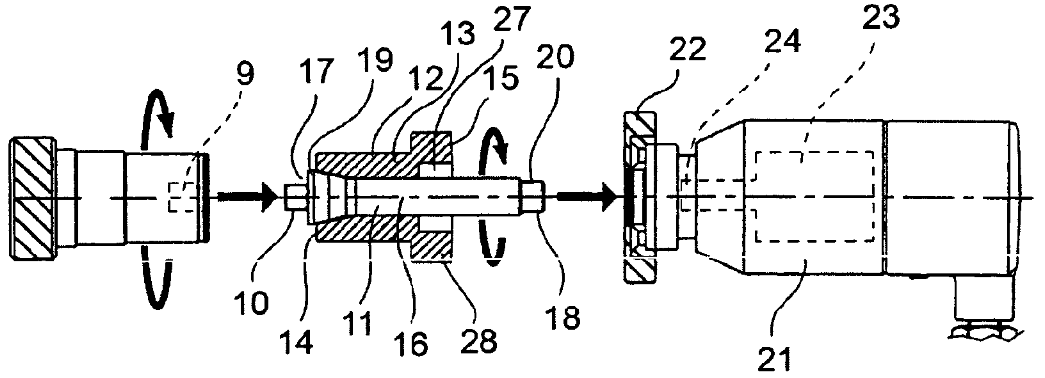
FIGS. 3-9 illustrates steps of a method and devices for applying a permanent electrical contact to the wall portion in FIG. 1 in accordance with an embodiment of the invention.
Figure 4:
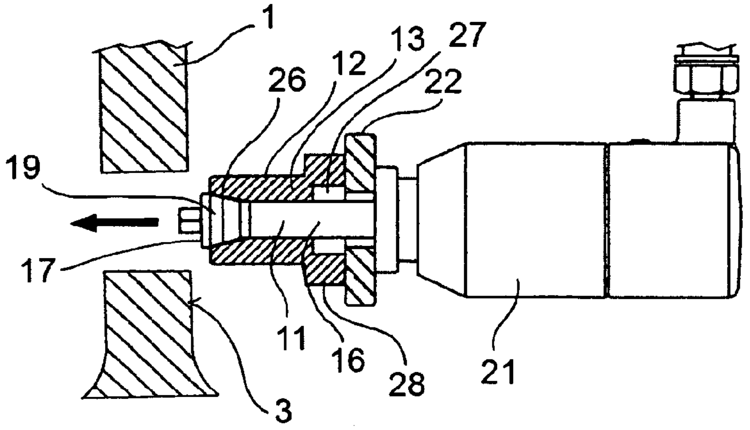
Figure 5:
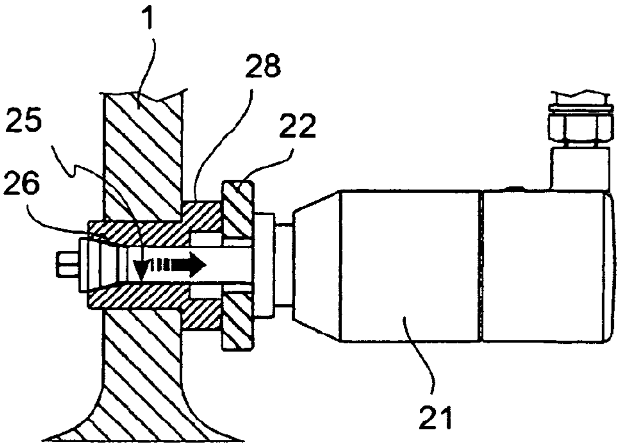
Figure 6:
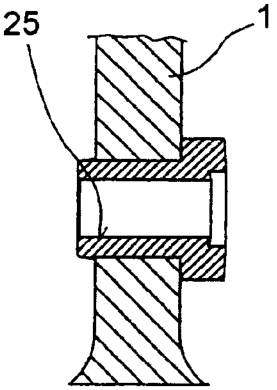
Figure 7:
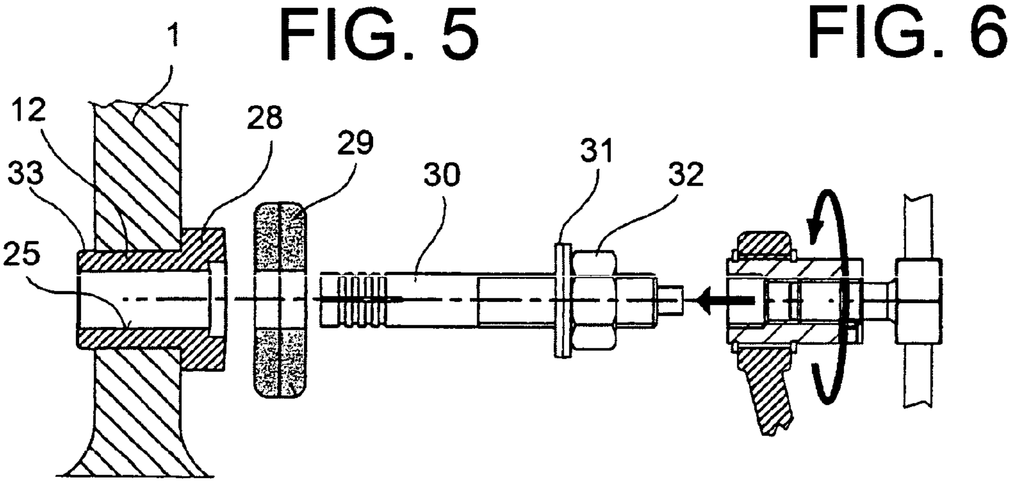
Figure 8:
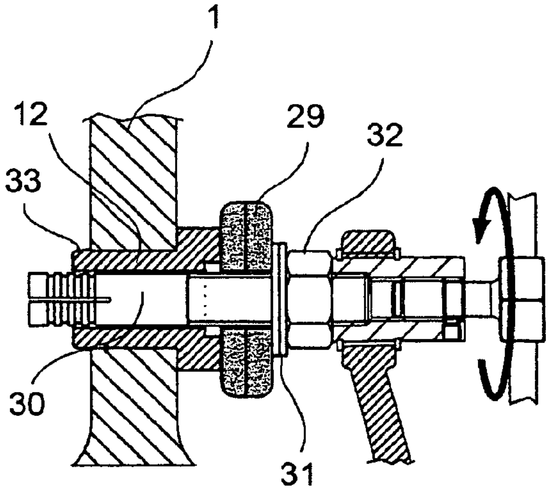
Figure 9:
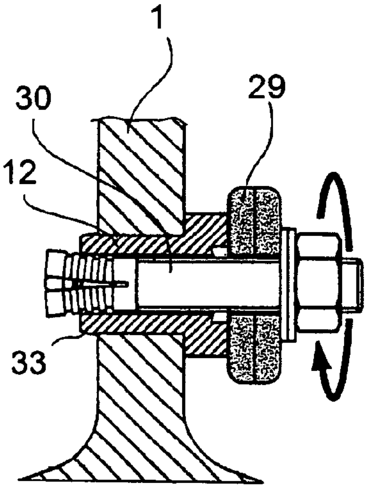

After having drilled the hole 2 in the wall portion 1, the correct hole diameter 5 can be verified by means of a caliber device 6 having a distal smaller diameter portion 7 and a proximal larger diameter portion 8 so that, when the smaller diameter portion 7 enters the hole 2 and the larger diameter portion doesn't (compare FIG. 2) the hole diameter 5 is correct. The caliber device 6 may also contain a spanner seat 9 adapted to engage a corresponding screw head 10 of a gauged punch 11 which will be described further below, so that additional spanners are obviated.

The method for applying a permanent electrical contact to the metal wall portion 1, illustrated in FIGS. 3-9, comprises the steps of:

providing a bush 12 with a tubular stem 13 having a distal end 14 and a proximal end 15, providing a punch 11 having an elongate shaft 16 with a distal end 17 and a proximal end 18, an enlarged, preferably truncated cone-shaped expansion portion 19 arranged near the distal end 17 of the shaft 16 and a connecting portion 20, e.g. a threaded portion, arranged near the proximal end 18 of the shaft 16, providing a pulling device 21, e.g. a hydraulic pulling jack, having a distal abutment portion 22, for instance an abutment ring, and a pulling mechanism 23 with a pull connector 24, e.g. a threaded connector, adapted to engage the connecting portion 20 of the punch and to pull it proximally with respect to the abutment portion 22, inserting the punch 11 in a passage hole 25 of the tubular stem 13 of the bush 12 so that the connecting portion 20 protrudes proximally from the proximal end 15 of the tubular stem 13 and the expansion portion 19 is located at the distal end 14 of the tubular stem 13, connecting, e.g. screwing, the connecting portion 20 of the punch 11 to the pull connector 24 of the pulling device 21 to connect the preassembled bush 12-punch 11-unit with the pulling device 21, inserting the (preassembled) bush 12-punch 11-unit from a proximal side of the wall portion 1 distally in the hole 2, activating the pulling mechanism 23 of the pulling device 21 to pull the punch 11 with its expansion portion 19 proximally through the passage hole 25 of the tubular stem, while the abutment portion 22 pushes in a distal direction against the proximal end 15 of the tubular stem 13, thereby radially expanding the tubular stem 13 and permanently anchoring the bush 12 in the hole. The radial expansion of the bush 12 which recovers the difference between the outer diameter of the bush stem 13 and the hole 2 of the wall portion 1, stably coupling the bush and the wall portion 1 in tight contact.

This method enables the fitter to install a permanent electrical contact in a wall portion, e.g. of a rail web or tubular profile, accessing it from one side only and performing each operation from only that proximal access side of the wall portion.

During pulling the punch, it is advantageous to maintain the distal abutment portion 22 of the pulling device 21 in stationary contact against the bush 12 or the wall portion (1), i.e. to not rotate or translate the distal abutment portion 22 with respect to the latter, in order to avoid undesirable grinding of their possibly plated surfaces.

In accordance with an embodiment, the bush 12 comprises a flanged head 28 formed on the proximal end 15 of the tubular stem 13 and having an external diameter greater than the external diameter of the stem 13 (and also of the hole 2) and, during insertion of the bush 12-punch 11-unit in the hole 2, the bush 12 is pushed distally until the flanged head 28 abuts against the proximal wall surface 3 surrounding the hole 2.

This enables the fitter to precisely position the bush 12 in the hole before activating the pulling device 21.

In accordance with a yet further embodiment, the bush 12 comprises a funnel shaped, preferably substantially truncated cone shaped expander seat 26 formed at the distal end of the tubular stem 13, i.e. in the distal end of the passage hole 25 thereof and adapted to receive at least a part of the expansion portion 19 of the punch 11.

This promotes an immediate radial expansion of the distal end 14 of the stem 13, rather than an axial compression thereof.

Moreover, near the proximal end 15 of the tubular stem 13 of the bush 12, a ring space 27 is formed which is larger than the passage hole 25 and adapted to receive excess material which is axially extruded by the punch proximally, thereby preventing undesired excessive deformation of the flanged head 28 or, more generally spoken, of the proximal end 15 of the bush 12.

In accordance with an embodiment, the length of the tubular stem 13 is selected to be so much greater than the thickness of the wall portion 1 at the hole 2, that, when the bush 12 is inserted in the hole 2, the distal end of the tubular stem 13 protrudes distally from the wall portion 1 and forms, after the passage of the punch 11, a distal flange 33 having an outer diameter greater than the diameter 5 of hole 2.

After completion of the installation of the bush 12 from one side only of the wall portion 1, a terminal lug 29 of an electrical cable can be removably or permanently electrically connected to the proximal end 15, particularly to the flanged proximal head 28 of the bush 12, for instance by means of:

soldering, welding, screwing a locking bolt from the proximal side in a thread cut in the passage hole 25, an expansion bolt 30 possibly but not necessarily equipped with a locking washer 31 and a locking nut 32, wherein the expansion bolt 30 is inserted from the proximal side in the passage hole 25 of the previously installed and expanded bush 12 and subsequently expanded acting on a proximal expansion activating portion of the expansion bolt 30 (FIGS. 8, 9) and the eyelet of the terminal lug 29 is inserted over the shaft of the expansion bolt 30 between the proximal end 15, i.e. the flanged head 28, of bush 12 and the locking nut 32.

As those skilled in the art will easily appreciate from the foregoing description, advantageously, also the fixation of the terminal lug 29 to the bush 12 is done by operations performed exclusively from the proximal access side of the wall portion 1.

The bush 12 is made of electrically conducting material such as copper, tin plated copper, aluminum and alloys thereof and the like.

While the present invention has been illustrated by description of embodiments and while the illustrative embodiments have been described in considerable detail, it is not the intention to restrict or in any way limit the scope of the appended claims to such detail.

The invention claimed is:

1. Method for applying a permanent electrical contact to a hole of a metal wall portion, particularly of a railway rail web or a tubular profile, comprising the steps of:

providing a bush with a tubular stem having a distal end and a proximal end, providing a punch having an elongate shaft with a distal end and a proximal end, an enlarged expansion portion arranged near the distal end of the shaft and a connecting portion arranged near the proximal end of the shaft, providing a pulling device having a distal abutment portion and a pulling mechanism with a pull connector adapted to engage the connecting portion of the punch and to pull it proximally with respect to the abutment portion, inserting the punch in a passage hole of the tubular stem of the bush so that the connecting portion protrudes proximally from the proximal end of the tubular stem and the expansion portion is located at the distal end of the tubular stem, connecting the connecting portion of the punch to the pull connector of the pulling device to connect the preassembled bush punch unit with the pulling device, inserting the preassembled bush punch unit from a proximal side of the wall portion distally in the hole, activating the pulling mechanism of the pulling device to pull the punch with its expansion portion proximally through the passage hole of the tubular stem, while the distal abutment portion pushes in stationary relationship in a distal direction against the proximal end of the bush, thereby radially expanding the tubular stem and permanently anchoring the bush in the hole.

2. Method according to claim 1, wherein the preassembled bush punch unit is connected with the pulling device before inserting the preassembled bush punch unit in the hole.

3. Method according to claim 1, wherein said bush comprises a flanged head formed on the proximal end of the tubular stem and having an external diameter greater than the external diameter of the stem and, during insertion of the bush punch unit in the hole, the bush is pushed distally until said flanged head abuts against the proximal wall surface surrounding the hole.

4. Method according to claim 1, wherein said bush comprises a funnel shaped expander seat formed in the distal end of the passage hole and, during insertion of the punch in the bush, at least a part of the expansion portion of the punch is received in said expander seat

5. Method according to claim 1, wherein near the proximal end (15) of the tubular stem of the bush, a ring space is formed which is larger than the passage hole and adapted to receive excess material which is axially extruded by the punch.

6. Method according to claim 1, wherein the length of the tubular stem is selected such that, when the bush is inserted in the hole, the distal end of the tubular stem protrudes distally from the wall portion and forms, after the passage of the punch, a distal flange having an outer diameter greater than the diameter of hole.

7. Method according to claim 1, in which, after completion of the installation of the bush from one side only of the wall portion, a terminal lug of an electrical cable is electrically connected to the proximal end of the bush.

8. Method according to claim 7, in which said terminal lug is connected to the bush by means of an expansion bolt having a proximal expansion activating portion and being inserted from the proximal side in the passage hole and subsequently expanded by acting on said proximal expansion activating portion.

9. Method according to claim 1, in which said bush is made of electrically conducting material such as copper, tin plated copper, aluminum and alloys thereof and the like.

* * * * *